(12) United States Patent
Cheng et al.

(10) Patent No.: US 11,938,402 B2
(45) Date of Patent: Mar. 26, 2024

(54) MULTI-PLAYER INTERACTIVE SYSTEM AND METHOD OF USING

(71) Applicant: RAKUTEN MOBILE, INC., Tokyo (JP)

(72) Inventors: Kelvin Ka Sin Cheng, Tokyo (JP); Kensuke Koda, Tokyo (JP); Soh Masuko, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 63 days.

(21) Appl. No.: 17/644,798

(22) Filed: Dec. 17, 2021

(65) Prior Publication Data

US 2022/0347576 A1 Nov. 3, 2022

Related U.S. Application Data

(60) Provisional application No. 63/183,059, filed on May 3, 2021.

(51) Int. Cl.
*A63F 13/56* (2014.01)
*A63F 13/211* (2014.01)
*G06F 3/01* (2006.01)

(52) U.S. Cl.
CPC ............ *A63F 13/56* (2014.09); *A63F 13/211* (2014.09); *G06F 3/011* (2013.01)

(58) Field of Classification Search
CPC ...... A63F 13/211; A63F 13/213; A63F 13/56; A63F 13/573; A63F 13/577; A63F 13/812; A63F 2300/1093; A63F 2300/5553; A63F 2300/8082; G06F 3/011; G06F 3/012; G06F 3/017; G06T 19/006; H04L 65/4015; H04L 67/131
See application file for complete search history.

(56) References Cited

U.S. PATENT DOCUMENTS

| 2019/0252054 | A1 | 8/2019 | Dirani et al. |
| 2019/0329129 | A1* | 10/2019 | Fajt ................... A63F 13/57 |
| 2020/0128054 | A1 | 4/2020 | Miller |

* cited by examiner

*Primary Examiner* — Lawrence S Galka
(74) *Attorney, Agent, or Firm* — HAUPTMAN HAM, LLP

(57) ABSTRACT

A method includes receiving information related to a first user. The method further includes instructing a first display to display an image related to the first user to a second user based on the received information. The method further includes generating an image of a virtual object. The method further includes instructing a second display to display an image of the virtual object. The method further includes detecting movement of the second user. The method further includes determining a velocity of the virtual object in response to a determination that the second user contacts the virtual object based on the detected movement of the second user. The method further includes generating a moving image of the virtual object based on the determined velocity of the virtual object. The method further includes instructing the second display to display the moving image of the virtual object.

20 Claims, 6 Drawing Sheets

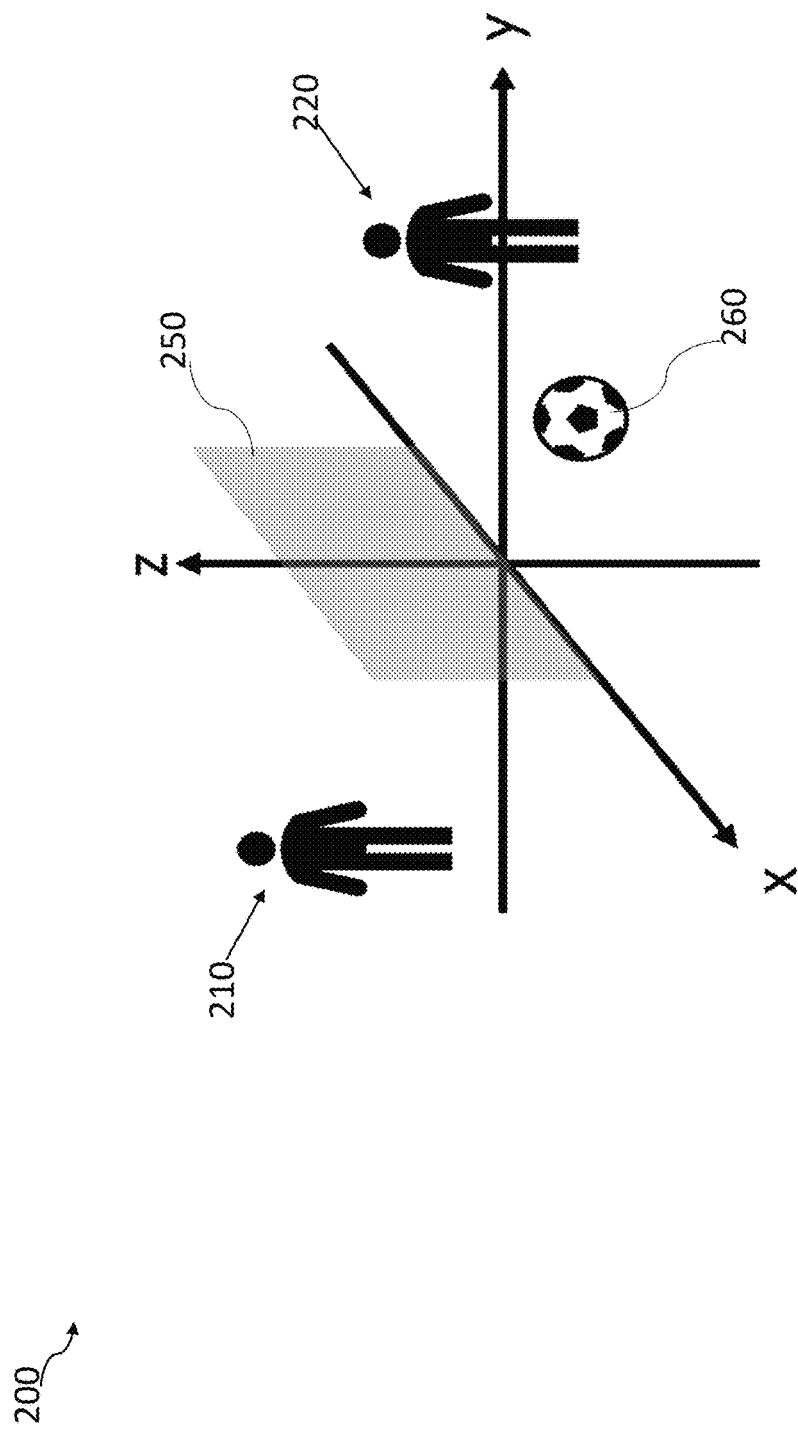

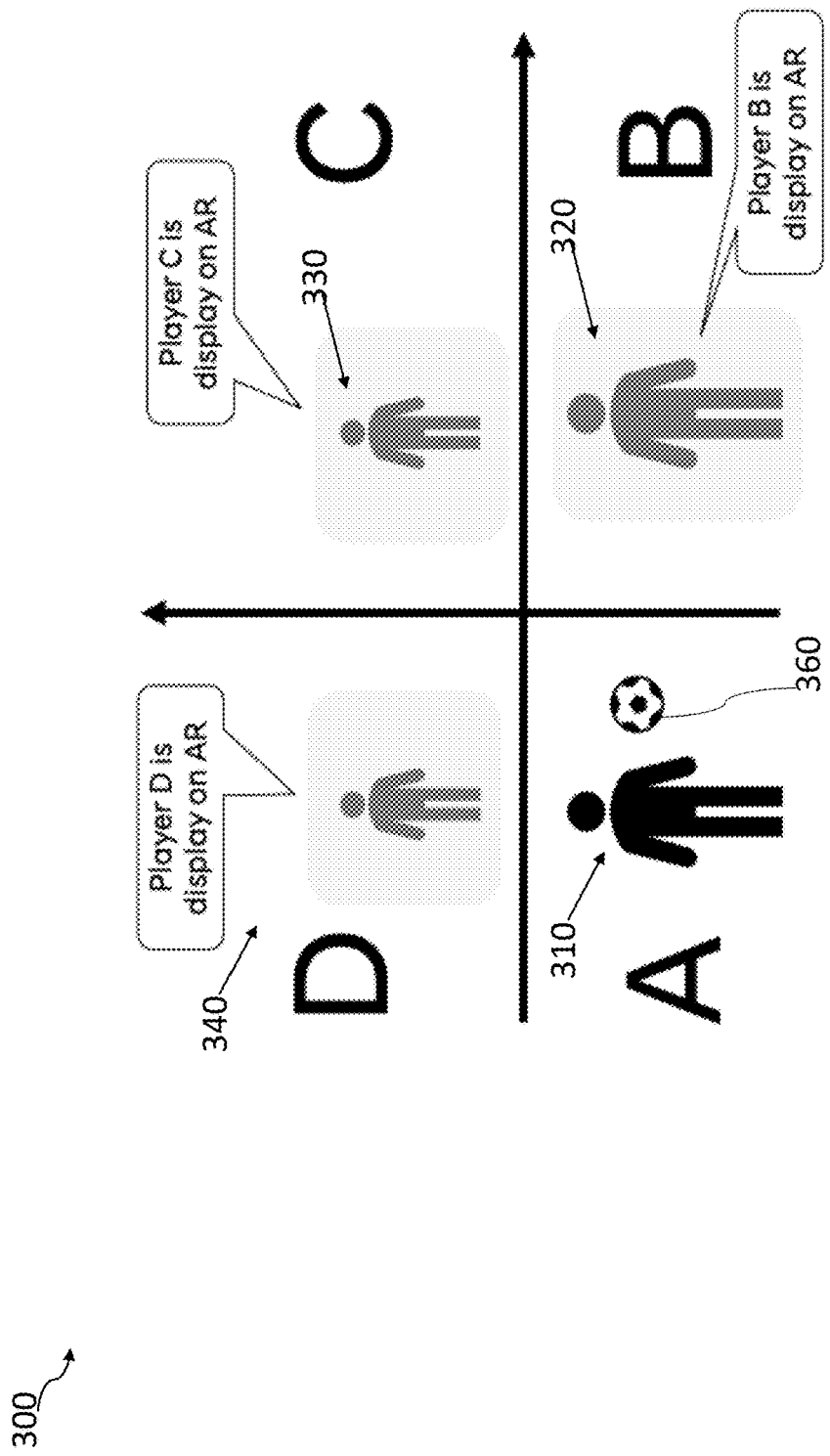

MULTI-PLAYER INTERACTIVE SYSTEM AND METHOD OF USING

PRIORITY CLAIM AND CROSS-REFERENCE

This application claims priority to Provisional Application No. 63/183,059, filed May 3, 2021, which is hereby incorporated by reference in its entirety.

BACKGROUND

Single user systems use a computer generated image to interact with the user during execution of the game or program. In some instances, the computer generated image is based on pre-recorded movements of a player. The computer generated image is limited to preset movements and responses. Interactions between the user and the computer generated image are limited to these preset movements and responses.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a schematic diagram of an implementation of a multi-player interactive system in accordance with some embodiments.

FIG. 3 is a schematic diagram of an implementation of a multi-player interactive system in accordance with some embodiments.

DETAILED DESCRIPTION

Figure 1:
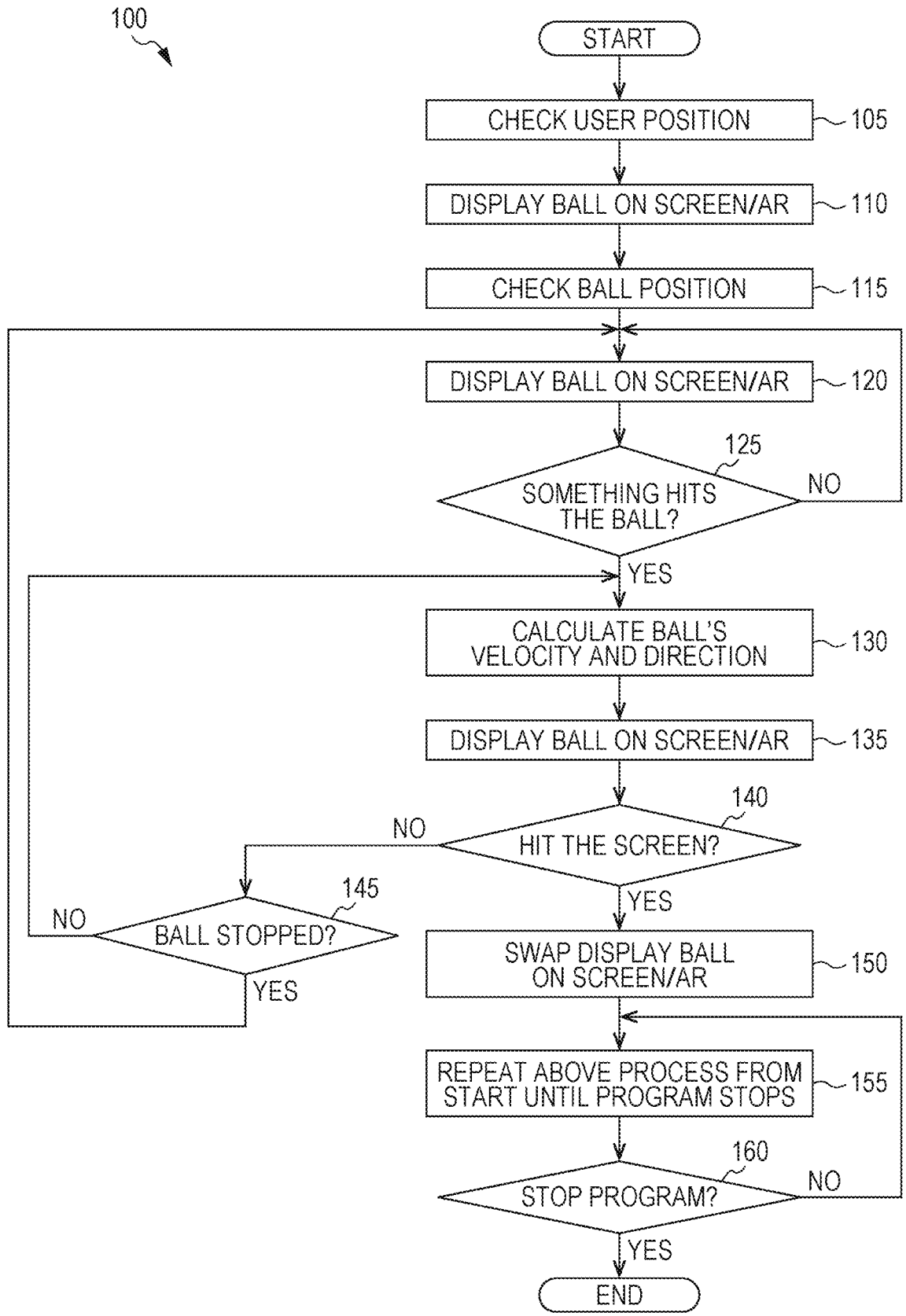
FIG. 1 is a flowchart of a method of implement a multi-player interactive system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Single user interactive systems limit a user's ability to improvise and have new experiences. Single user interactive systems also do not allow a user to communicate with friends during play. In contrast, a multi-player interactive system is not limited to preset movements and responses and users are able to act and respond in any way the users desire. This increased flexibility enhances the experience for the users and increases the level of enjoyment.

Through the user of augmented reality (AR) and virtual reality (VR), a user able to perceive the presence of objects and people that are not in physical proximity to the user. Utilizing AR and VR in a multi-player interactive system allows a user to see and interact with a friend or companion that is actually in a remote location from the user. By incorporating a virtual object (VO), the user is able to enjoy a game or sport with the friend, which further enhances the enjoyment of the user.

A head mounted display (HMD) is worn by the users in order to allow the users to perceive one another and the VO. In an AR implementation, the HMD has a transmissive or partially transmissive display. In a VR implementation, the HMD has a non-transmissive display. The multi-player interactive system tracks the movements of the users within an area in order to allow the users to manipulate the VO. For example, a first user is able to see the VO using the HMD. The first user then moves a portion of the body, such as a foot, in order to contact the VO. The VO then moves based on the contact from the first user and a second user now has an opportunity to interact with the VO. While the term "contact" is used above, one of ordinary skill in the art would recognize that no physical contact occurs. Instead, contact is determined by a detected location of the first user's foot matching a location of the VO calculated by the multi-player interactive system. Both of the users are able to see the first user move toward the VO, contact the VO, and the subsequent movement of the VO. In such a manner, the users are able to interact with one another. In some embodiments, an image of the first user, including movement of the first user, is displayed at a location of the second user on a display visible without the use of an HMD. Similarly, in some embodiments, an image of the second user, including movement of the second user, is displayed at a location of the first user on a display visible without the use of an HMD.

The following description includes examples of AR technology for implementing the multi-player interactive system. One of ordinary skill in the art would recognize that VR technology is also usable to implement the multi-player interactive system. The following description includes an example of the VO being a soccer ball. One of ordinary skill in the art would recognize that other types of VOs are also usable in the multi-player system and are discussed briefly below for the sake of brevity.

FIG. 1 is a flowchart of a method 100 of implementing a multi-player interactive system. In some embodiments, the multi-player interactive system is implementing using hardware, such as computers, sensors, projectors, HMDs or other suitable hardware. Some example of hardware are described below.

In operation 105, a user position is checked. The user position is checked using a sensor to track a user's movements within a detection area. In some embodiments, checking the position of the user includes checking the position of portions of the user's body, such as hands, feet, arms, legs and heads. Using the output of the sensor(s) the location of the user including various body parts of the user is determined.

In some embodiments, the sensor uses visible light or infrared (IR) light to track the position of the user. In some embodiments, the sensor using structured light or time of flight calculations to determine the position of the user. In some embodiments, multiple sensors are used to check the user position. In some embodiments, each sensor monitors a designated portion of the detection area. In some embodiments, areas monitored by the sensors overlap. In some embodiments, information from an HMD worn by the user is also used in determining the position of the user. In some embodiments, an additional controller held by or attached to the user helps in determining the position of the user.

In some embodiments, if a portion of the user's body is outside of the detection area, then that portion of the user's body is not utilized in later operations of the method 100.

Operation 105 is performed for each of the users in the multi-player interactive system. That is, the position of each of the users is determined. The positions of other users is displayed to each user. The positions of the other users are displayed in a similar manner as the ball is displayed, as described below.

In operation 110, a ball is displayed either on a display or using the HMD. The ball is an example of a VO. If the ball is calculated to be proximate a second user, the ball will be displayed on the display. If the ball is calculated to be proximate the user, the ball will be displaying using the HMD. The calculation of the position of the ball will be described in more detail below.

In some embodiments, where the ball is displayed on the display, an image of the ball is projected onto the display using a projector. A signal is transmitted to the projector to indicate the location of the ball. In some embodiments, the display includes a reflective display screen and the image of the ball is displayed by projecting the image onto the display screen using a projector. In some embodiments, the display includes a liquid crystal display (LCD), light emitting diode (LED display, organic LED (OLED) display or another suitable type of display and the image of the ball is displayed by the display device itself.

In some embodiments where the ball is displayed using the HMD, a signal is transmitted to the HMD to indicate a location of the ball in the detection area. Based on the indicated location of the ball in the detection area, the HMD transmits the image to the eyes of the user. In some embodiments, the HMD includes a transmissive or partially transmissive display, such as smart glasses. In some embodiments, the HMD includes a non-transmissive display. The non-transmissive display HMD provides a more immersive experience; however, the non-transmissive display HMD often is heavier and could impair the user's ability to see objects in the real world. In some embodiments, the image of the ball is displayed using stereoscopic images to produce a three-dimensional image to the user. In some embodiments, the HMD is equipped with audio equipment, such as a speaker or a microphone to facilitate audio communication between users and/or to provide ambient sounds to enhance the immersive nature of the experience. For example, the sounds of a crowd in a stadium or the sounds of a park could be used to help simulate a desires environment for the users. In some embodiments, the audio equipment is separate from the HMD.

In operation 115, a position of the ball is checked. The position of the ball is determined using a processor. In some embodiments, the processor used to determine the position of the ball is a same processor as that used to transmit the image of the ball to the HMD or projector. The position of the ball is determined based on a velocity of the ball and interaction between the ball and virtual or real-world objects. For example, if a virtual tree is present in the image displayed by the projector or HMD and the ball hits the virtual tree, then the position of the ball will change based on this interaction. Similarly if there is a virtual hill a speed of the ball will change based on an orientation of the virtual hill. Contact between a real-world object such as a portion of the user's body or an article held by the user is also used to determine a positon of the ball. As noted above, contact is determined based on an overlap of a detected position of the portion of the user's body or the article and the calculated positon of the ball.

In operation 120, the ball is displayed on the screen or HMD. Operation 120 is similar to operation 115 and is used to display an updated positon of the ball based on movement of the ball and/or interaction with real-world or virtual objects.

In operation 125, a determination is made regarding whether the ball is hit or contacted. The determination includes determining whether the ball contacts either another VO, such as a virtual tree, or a real-world object like a portion of the user's body or an article held by the user. Contact with a VO is determined based on a calculated position and movement of the ball and a position of the VO in the virtual world. A position and movement of the user is not used in determining whether the ball contacts another VO in some embodiments. In some embodiments, the VO is a virtual object controlled by the user, such as a virtual tennis racket or virtual bat. In some embodiments where the VO is controlled by the user, movement of the user is used to determine contact between the ball and the VO. Contact between a real-world object, such as a portion of the user's body or an article held by the user, is determined based on an overlap of a detected position of the portion of the user's body or the article and the calculated positon of the ball.

In some embodiments, the VO is contacted by the user by the user catching the ball. For example, catching a baseball or a Frisbee, where a Frisbee is used in place of a ball as the VO. In some embodiments, the VO is contacted by the user by the user picking the ball up from a container of balls.

In response to a determination that the ball is not hit or contacted, the method 100 returns to operation 120. In some embodiments where the user attempted to hit or contact the ball but missed, a virtual wall, virtual fence or virtual hill is positioned on an opposite side of the user from the display in order to redirect the ball back toward the user. In some embodiments where the user attempted to hit or contact the ball but missed, a new ball is introduced and the users are notified of the location of the new ball. In some embodiments, the notification includes an audio or visual indication of the new ball. In some embodiments, such as a baseball simulation or a tennis simulation, a virtual container of balls is available and the user is able to retrieve another ball from the virtual container.

In response to a determination that the ball is hit or contacted, the method 100 proceeds to operation 130 in which the velocity of the ball is determined. Determining the velocity of the ball includes determining both the speed and direction of the ball following the hit or contact. The velocity of the ball following the hit or contact is determined based on a velocity of the ball prior to the hit or contact and a speed and direction of the object that contacts or hits the ball. For example, where the ball is a soccer ball, the velocity of the ball is determined by the initial velocity of the ball and the speed and direction of movement of a user's foot at a point where the user's foot contacts the ball. In another example, where the ball is a baseball, the velocity of the ball is determined by the initial velocity of the ball and the speed and direction of a movement of a bat or virtual bat held by the user. The velocity of the ball is determined using a processor.

In some embodiments where the contact is a catch, the velocity of the ball is zero until the ball is thrown to the other user. The other user will see the ball being caught on the display. In some embodiments where the contact is picking a ball from a container of balls the velocity of the ball is determined by the movement of the user's hand until the ball the thrown to the other user.

In operation 135, the ball is displayed on the screen or HMD. Operation 135 is similar to operation 115 and is used to display an updated positon of the ball based on movement of the ball following the contact or hit.

In operation 140 a determination is made regarding whether the ball hits the display. As discussed above, the image of another user is displayed to the user. The determination in operation 140 is whether the velocity and position of the ball are sufficient for the ball to reach the transition point between the detection area and the display on which the other user is displayed. In some embodiments where the other user is displayed using the HMD, no physical screen or display exists, but the location of the other user is still known. The determination is made regarding whether the ball will reach the other user in order to permit the other user to interact with the ball.

In some instances, the ball is determined not to hit the display in response to a determination that the direction of the ball calculated in operation 130 indicates that the ball would miss the display, i.e., to the right or to the left of the display.

In response to a determination that the ball will not hit the display, the method 100 proceeds to operation 145 in which a determination is made regarding whether the ball has stopped. The determination is made regarding whether the ball has stopped by whether the calculated velocity of the ball reaches zero. That is, a determination is made regarding whether the calculated friction against the movement of the ball cause the ball to slow down and stop. The calculated friction is based on a surface in the virtual world, such as grass, turf, dirt or another type of surface.

In response to a determination that the ball has stopped, the method 100 returns to operation 120 and the new location of the ball is displayed. In some embodiments where the ball is too close to the display, a new ball is displayed in operation 120 similar to the description above regarding when the user misses a ball. A ball is determined to be too close to the display when a proximity between the ball and the display is sufficiently small that the user is likely to hit or damage the display if the user attempts to hit or contact the ball at the stopped location. In some embodiments where the ball is sufficiently distant from the display, the user is able to hit or contact the ball again. In some embodiments, the user is prompted either visually or using audio to hit or contact the ball again.

In response to a determination that the ball has not stopped, the method 100 returns to operation 130 and the user is given another chance to hit or contact the ball and a new velocity of the ball is calculated.

In response to a determination that the display is hit by the ball, the method 100 proceeds to operation 150. In operation 150, the ball is displayed on the display to the user similar to the manner described above. The other user that is displayed on the display hit by the ball will then be able to view the image of ball displayed using the HMD worn by the other user.

In operation 155, the method 100 is repeated until the program or simulation is stopped. Repeating the method 100 permits the ball to move between users numerous times. Each time the ball is proximate another user, the ball is displayed on the display. Each time the ball approaches the user, the ball is displayed using the HMD and the user has an opportunity to hit or contact the ball.

In operation 160 a determination is made regarding whether the program or simulation has stopped. In some embodiments, the program or simulation is stopped based on an input received from the user, such as through a controller, verbal input or audio input. In some embodiments, the program or simulation is stopped based on a time limit. In some embodiments, the program or simulation is stopped in response to detection of a user moving in a hazardous manner. In some embodiments, a notification is provided to each of the users prior to stopping the program or simulation.

In response to a determination that the program or simulation has stopped, the method 100 ends.

In response to a determination that the program or simulation has not stopped, the method 100 returns to operation 155 and the program or simulation continues to run.

FIG. 2 is a schematic diagram of an implementation of a multi-player interactive system 200 in accordance with some embodiments. In some embodiment, the implementation of multi-player interactive system 200 is achieved using the method 100 (FIG. 1). A first user 210 is in a first location. A second user 220 is in a second location. The first location is separate from the second location. In some embodiments, the first location is in a different building from the second location. A display 250 is used to represent displays viewable by each of the first user 210 and the second user 220. The first user 210 is able to view the second user 220 using a first display, while the second user 220 is able to view the first user 210 using a second display different from the first display. The display 250 is a conceptual representation of the first display and the second display. A VO 260 is proximate the second user 220. The VO 260 is indicated as a soccer ball. In some embodiments, the VO 260 is a different type of ball, a Frisbee or another article. In some embodiments, instead of a display or a screen, the first user 210 views the second user 220 using the HMD.

The first user 210 is able to view the second user 220 on the first display. In some embodiments, the second user 220 is able to control the appearance of the image displayed on the first display. For example, in some embodiments, the second user 220 is able to select a uniform of a favorite team or other articles of clothing to be displayed to the first user 210. In some embodiments, the second user 220 is able to appear as an avatar to the first user 210. In some embodiments, the second user 220 is able to control the appearance to the first user 210 through the user of a controller. In some embodiments, the second user 220 is able to control the appearance to the first user 210 based on pre-set preferences associated with the second user 220. Similarly, the first user 210 is able to control the appearance of the first user 210 displayed to the second user 220 on the second display.

In some embodiments, at least one of the first user 210 or the second user 220 is able to control the virtual ambient environment displayed on the display 250. For example, in some embodiments, the display 250 displays an ambient environment of a park, a stadium or another venue. In some embodiments, only one of the first user 210 or the second user 220 is able to control the virtual ambient environment. In some embodiments, both of the first user 210 and the second user 220 are able to control the virtual ambient environment.

FIG. 3 is a schematic diagram of an implementation of a multi-player interactive system 300. The implementation in FIG. 3 is similar to the implementation in FIG. 2. In comparison with FIG. 2, the implementation in FIG. 3 has more than two users. A first user 310 is in a first location A. A second user 320 is in a second location B. A third user 330 is in a third location C. A fourth user 340 is in a fourth location D. A VO 360 is displayed as being proximate the first user 310.

In some embodiments, each user has the ability to view three displays and each of the other users are on a corresponding one of the three displays. In some embodiments, each of the users has a single display and two of the other users are displayed on a same display. For examples, the display viewable by the first user 310 shows the third user 330 and the fourth user 340; while the display viewable by the third user 330 shows the first user 310 and the second user 320. When the first user 310 contacts the VO 360, the velocity of the VO 360 calculated by a processor will determine which of the third user 330 or the fourth user 340 will view the VO 360 as coming toward themselves. For the user that views the VO 360 as coming toward themselves, the VO 360 will transition from the display to the HMD image within the location of the user. In some embodiments, instead of a display or a screen, the users view one another using HMDs.

Figure 4A:
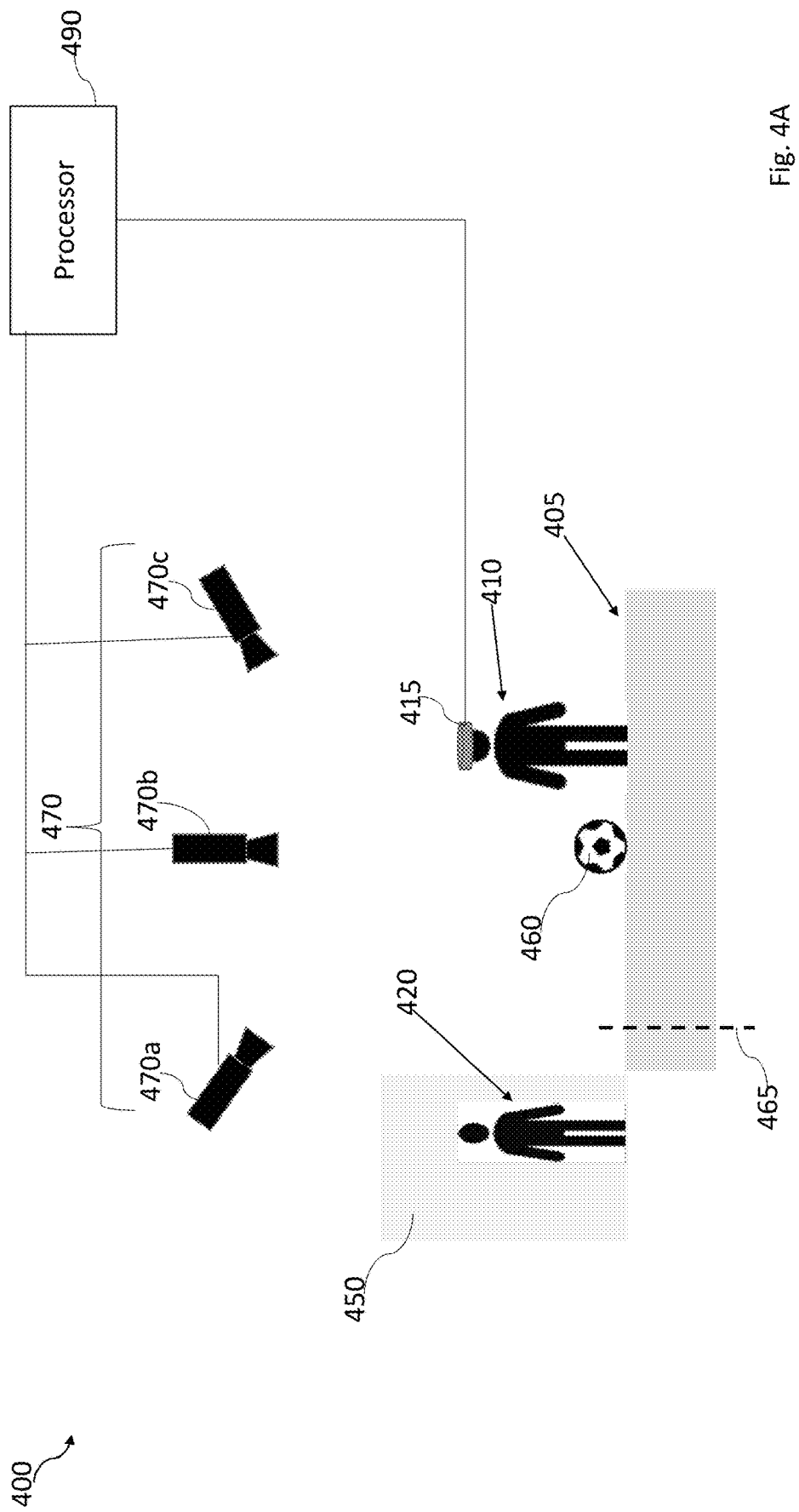
FIG. 4A is a schematic diagram of a multi-player interactive system in accordance with some embodiments.

FIG. 4A is a schematic diagram of a multi-player interactive system 400 in accordance with some embodiments. FIG. 4A includes a first user 410 and a second user 420; however, the users themselves are not part of the multi-player interactive system 400. The multi-player interactive system 400 is capable of implementing the method 100 (FIG. 1). The multi-player interactive system 400 is also capable of implementing the features described with respect to FIGS. 2 and 3. FIG. 4A is from a perspective of a first user 410. One of ordinary skill in the art would understand that a similar system would be used by a second user 420 during the interaction between the two users.

The multi-player interactive system 400 includes a detection area 405 where movements of the first user 410 are detectable. A HMD 415 is wearable by the first user 410. A display 450 is viewable by the first user 410 through the HMD 415. In some embodiments where the HMD 415 includes a non-transmissive display the display 450 is omitted. An image of the second user 420 is displayed on the display 450. A VO 460 is in the detection area 405. The VO 460 is a virtual object and does not exist in the real-world. The location of the VO 460 is determined by a processor 490. A proximity line 465 indicates a distance from the display 450 the first user 410 should maintain in order to minimize risk of damaging the display 450. In some embodiments, the proximity line 465 is visible to the first user 410 either in the real-world or through the HMD 415. A first image device 470a, a second image device 470b and a third image device 470c are collectively called image devices 470. Each of the image devices 470 are independently selected as a sensor for detecting movements of the first user 410 or displaying information on the display 450. In some embodiments, a single image device 470 is used in the multi-player interactive system. In some embodiments, more or less than three image devices 470 are used in the multi-player interactive system 400. The processor 490 is configured to exchange information with the image devices 470 and the HMD 415. Using the information from the image devices 470 and the HMD 415, the processor 490 is usable to determine the location and movement of the VO 460 and to control the information visible to the first user 410 either on the display 450 or the HMD 415.

The detection area 405 is an area where movements of the first user 410 are detectable by the image devices 470. A size of the detection area 405 is determined by the image devices 470; and the image devices 470 are arranged to define the detection area 405 based on a type of interaction expected between the first user 410 and the second user 420. In some embodiments, the multi-player interactive system 400 is capable of numerous different interactions and the image devices 470 are arranged based on the interaction that is expected to use a greatest amount of space. In some embodiments, the detection area 405 is visible to the first user 410 without using the HMD 415. In some embodiments, the detection area 405 is visible to the first user 410 only using the HMD 415. In some embodiments, the processor 490 provides a notification to the first user 410 when a portion of the first user 410 moves outside of the detection area 405. In some embodiments, the notification is auditory or visual.

The HMD 415 permits the first user 410 to view the VO 460. In some embodiments, the HMD 415 also permits the first user 410 to view the second user 420. In some embodiments, the display 450 is omitted and the first user 410 is able to view the second user 420 using the HMD 415 without the display 450. In some embodiments, the HMD 415 includes audio equipment for providing audio information to the first user 410 and receiving audio information from the first user 410. In some embodiments, the audio equipment includes at least one of a speaker or a microphone. In some embodiments, audio equipment is provided separate from the HMD 415, but proximate to the detection area 405. In some embodiments, the HMD 415 includes a transmissive or partially transmissive display. In some embodiments, the HMD 415 includes a non-transmissive display. In some embodiments, the HMD 415 provides a stereoscopic image to the first user 410. In some embodiments, the HMD 415 includes smart glasses. In some embodiments, the HMD 415 surrounds the head of the first user 410. In some embodiments, the HMD 415 communicates with the processor 490 wirelessly.

The display 450 is configured permit the first user 410 to view the second user 420. In some embodiments, the display 450 includes a reflective screen configured to receive an image projected from one of the image devices 470. In some embodiments, the display 450 includes a display panel that generates the image of the second user 420. In some embodiments, the display 450 is omitted where the first user 410 is able to view the second user 420 using the HMD 415 without the need of the display 450.

The VO 460 is an image viewable using the HMD 415. In some embodiments, the VO 460 is a ball, such as a soccer ball or a baseball. In some embodiments, the VO 460 is different from a ball, such as a disc or bubbles. Positions and movements of the VO 460 are determined by the processor 490 based on interactions between the first user 410 and the second user 420 with the VO 460. In some embodiments, the processor 490 is configured to generate a new VO 460 in response to the VO 460 being directed out of the detection area 405 for each of the first user 410 and the second user 420. In some embodiments, the processor 490 is configured to include additional virtual objects, viewable using the HMD 415, as part of an ambient virtual environment. In some embodiments, the movement and position of the VO 460 is determined based on interactions between the VO 460 and the additional virtual objects.

In some embodiments, the first user 410 hold a real article and movements and positions of the VO 460 are determined based on interactions between the real article and the VO 460. For example, in some embodiments where the VO 460 is a baseball, the first user 410 holds a bat and tries to hit the VO 460 as pitched from the second user 420. In some embodiments, processor 490 determines interactions between the real article and the VO 460 based on information received from the image devices 470.

In some embodiments, the processor 490 is configured to generate a virtual article held by the first user 410. The location of the virtual article is determined based on a detected location of a hand of the first user 410. For example, a virtual bat or virtual tennis racket would be located near a detected hand of the first user 410. In some embodiments, an additional controller or object is located on the hand of the first user 410 to assist in detecting movements of the hand. As the hand of the first user 410 moves, the virtual article moves in accordance with the detected movement. In some embodiments, movements and positions of the VO 460 are determined based on interactions with the virtual article held by the first user 410.

In some embodiments, the processor 490 is configured to adjust an appearance of the second user 410 viewable by the first user 410 based on inputs received from the second user 420. Items that are changeable for altering the appearance of the second user 420 include, in some embodiments, clothing, background or body style. In some embodiments, the second user 420 is able to appear as an avatar viewable by the first user 410 instead of a real image of the second user 420.

The proximity line 465 is used to help minimize a risk of damage to the display 450. In some embodiments, the proximity line 465 is visible by the first user 410 without the HMD 415. In some embodiments, the proximity line 465 is visible to the first user 410 using the HMD 415. In some embodiments, the proximity line 465 is not visible to the first user 410. In some embodiments, the processor 490 sends a notification to the first user 410 when the first user 410 crosses the proximity line 465 or is within a predetermined distance from the proximity line 465. In some embodiments, a location of the proximity line 465 is set based on the type of interaction between the first user 410 and the second user 420. For example, in some embodiments where the interaction is kicking a soccer ball, a distance between the proximity line 465 and the display 450 is less than where the interaction is hitting a baseball. In some embodiments, the processor 490 is configured to generate a new VO 460 in response to the VO 460 stopping between the proximity line 465 and the display 450 based on the calculations performed by the processor 490.

The image devices 470 are configured to detect movements of the first user 410 in the detection area 405. In some embodiments, the image devices 470 also project the image of the second user 420 on the display 450. In some embodiments, each of the image devices 470 are a same type of device. For example, in some embodiments, each of the image devices 470 is a structured light sensor. In some embodiments, at least one of the image devices 470 is different from another of the image devices 470. For example, in some embodiments, the first image device 470a is a structured light sensor, the second image device 470b is a time of flight sensor, and the third image device 470c is an image projector. In some embodiments, all of the image devices 470 operate simultaneously. In some embodiments, at least one of the image devices 470 functions as a back-up device when another of the image devices 470 is non-functional. In some embodiments, the image devices 470 communicate with the processor 490 by a wired connection. In some embodiments, the image devices 470 communicate with the processor 490 wirelessly.

The processor 490 is configured to receive information related to the movements of the first user 410 and the second user 420. The processor 490 uses the received information in order to generate the image of the second user 420 viewable by the first user 410. The processor 490 also uses the received information to determine the position and movement of the VO 460 by determining whether and how each of the first user 410 and the second user 420 interact with the VO 460. In some embodiments, the processor 490 is also configured to receive information from the first user 410 and/or the second user 420, such as through a mobile device, to determine the desired appearance of the corresponding user used to generate the image of that user. The processor 490 is able to communicate with a complementary processor (not shown) at the location of the second user 420 in order to accurately display the second user 420 on the display 450 and to communicate movements of the first user 410 for display at the location of the second user 420. In some embodiments, the processor 490 communicates with the complementary processor using a wired connection. In some embodiments, the processor 490 communicates with the complementary processor wirelessly.

Figure 4B:
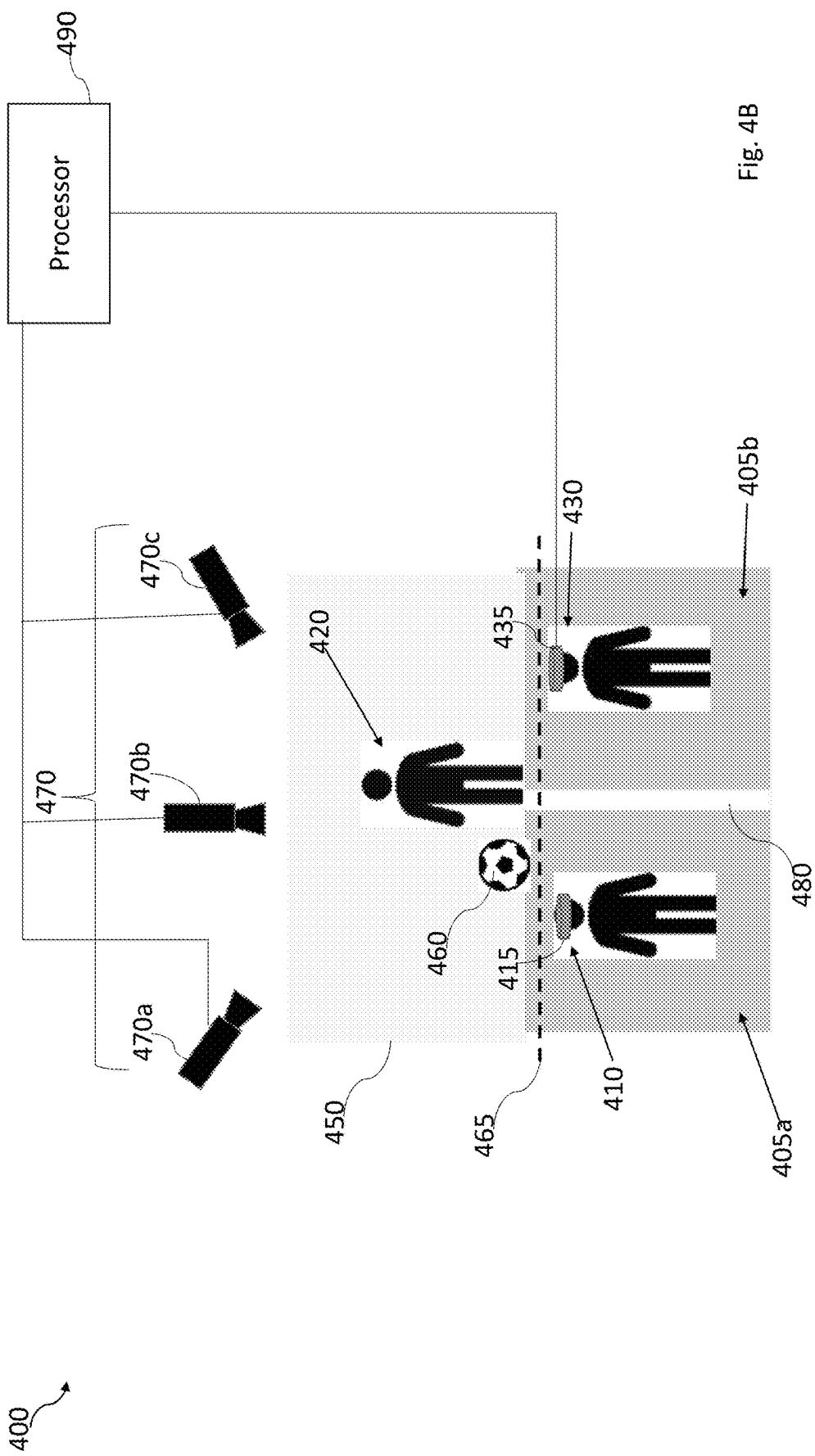
FIG. 4B is a schematic diagram of a multi-player interactive system in accordance with some embodiments.

FIG. 4B is a schematic diagram of a multi-player interactive system 400 in accordance with some embodiments. FIG. 4B is similar to FIG. 4A. In comparison with FIG. 4A, FIG. 4B includes a third user 430 in a same location as the first user 410. FIG. 4B is from a perspective of the first user 410 and the third user 430. One of ordinary skill in the art would understand that a similar system would be used by the second user 420 during the interaction between the two users. An HMD 435 wearable by the third user 430 is similar to the HMD 415 described above. FIG. 4B includes a connection between processor 490 and HMD 435. The connection between the processor 490 and HMD 415 is omitted for clarity of the drawing.

FIG. 4B includes two detection area 405a and 405b. The first detection area 405a is used for tracking the movements of the first user 410. The second detection area 405b is used for tracking the movements of the third user 430. In some embodiments, separate image devices 470 are associated with each of the detection areas 405a and 405b. In some embodiments, the same image devices 470 are used to track movements in both the first detection area 405a and the second detection area 405b.

A separation line 480 is between the first detection area 405a and the second detection area 405b. The separation line 480 is used to help minimize a risk of the first user 410 and the third user 430 contacting each other. In some embodiments, the separation line 480 is visible by the first user 410 without the HMD 415 and/or the third user 430 without the HMD 435. In some embodiments, the separation line 480 is visible to the first user 410 using the HMD 415 and/or to the third user 430 using the HMD 435. In some embodiments, the separation line 480 is not visible to the first user 410 or the third user 430. In some embodiments, the processor 490 sends a notification to the first user 410 or the third user 430 when the first user 410 or the third user 430 crosses the separation line 480 or is within a predetermined distance from the separation line 480. In some embodiments, a location of the separation line 480 is set based on the type of interaction between the users. For example, in some embodiments where the first user 410 is attempting to hit the VO 460 with a bat and the third user 430 is attempting to catch the VO 460 pitched by the second user 420, the separation line 480 is moved closer to the first user 410 to reduce an area in which the first user 410 moves for reducing a risk of contact between the first user 410 and the third user 430.

Figure 5:
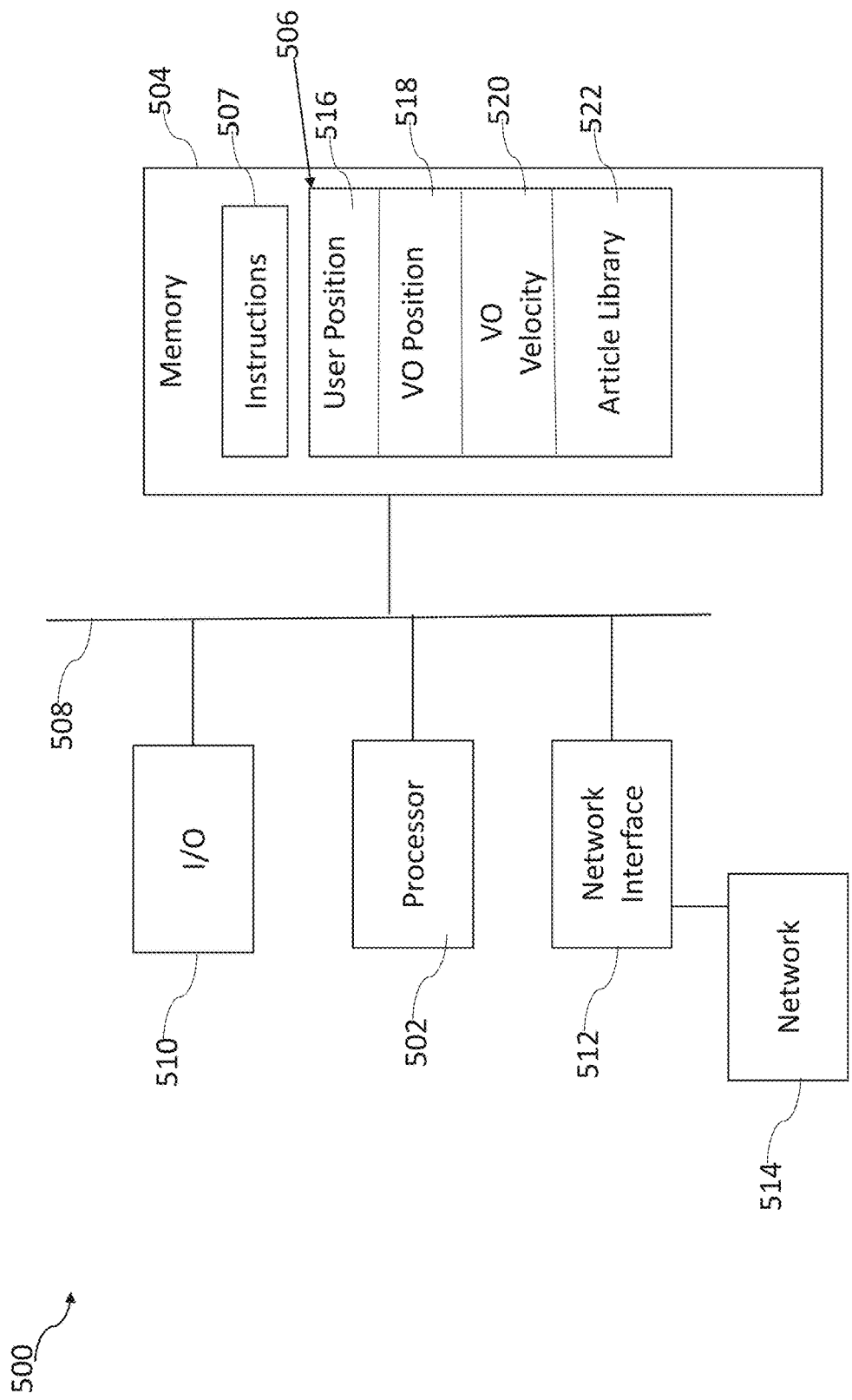
FIG. 5 if a block diagram of a system for implementing a multi-player interactive system in accordance with some embodiments.

FIG. 5 if a block diagram of a system for implementing a multi-player interactive system 500 in accordance with some embodiments. System 500 includes a hardware processor 502 and a non-transitory, computer readable storage medium 504 encoded with, i.e., storing, the computer program code 506, i.e., a set of executable instructions. Computer readable storage medium 504 is also encoded with instructions 507 for interfacing with sensors, such as image devices 470 (FIG. 4A) or HMD 415 (FIG. 4A), and other processors, such as the complementary processor discussed above. The processor 502 is electrically coupled to the computer readable storage medium 504 via a bus 508. The processor 502 is also electrically coupled to an I/O interface 510 by bus 508. A network interface 512 is also electrically connected to the processor 502 via bus 508. Network interface 512 is connected to a network 514, so that processor 502 and computer readable storage medium 504 are capable of connecting to external elements via network 514. The processor 502 is configured to execute the computer program code 506 encoded in the computer readable storage medium 504 in order to cause system 500 to be usable for performing a portion or all of the operations as described in method 100 or described with respect to FIGS. 2-4B.

In some embodiments, the processor 502 is a central processing unit (CPU), a multi-processor, a distributed processing system, an application specific integrated circuit (ASIC), and/or a suitable processing unit.

In some embodiments, the computer readable storage medium 504 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD). In some embodiments, the computer readable storage medium 504 is part of a cloud storage system.

In some embodiments, the storage medium 504 stores the computer program code 506 configured to cause system 500 to perform method 100 or the processes described with respect to FIGS. 2-4B. In some embodiments, the storage medium 504 also stores information needed for performing a method 100 or the processes described with respect to FIGS. 2-4B as well as information generated during performing the method 100 or the processes described with respect to FIGS. 2-4B, such as a user position parameter 516, a VO position parameter 518, a VO velocity parameter 520, an article library parameter 522 and/or a set of executable instructions to perform the operation of method 100 or the processes described with respect to FIGS. 2-4B.

In some embodiments, the storage medium 504 stores instructions 507 for interfacing with external devices. The instructions 507 enable processor 502 to generate images for display to the users of the system 500.

System 500 includes I/O interface 510. I/O interface 510 is coupled to external circuitry. In some embodiments, I/O interface 510 includes a keyboard, keypad, mouse, trackball, trackpad, touch-screen and/or cursor direction keys for communicating information and commands to processor 502.

System 500 also includes network interface 512 coupled to the processor 502. Network interface 512 allows system 500 to communicate with network 514, to which one or more other computer systems are connected. Network interface 512 includes wireless network interfaces such as BLUETOOTH, WIFI, WIMAX, GPRS, or WCDMA; or wired network interface such as ETHERNET, USB, or IEEE-1394. In some embodiments, method 100 or the processes described with respect to FIGS. 2-4B is implemented in two or more systems 500, and information is exchanged between different systems 500 via network 514.

System 500 is configured to receive information related to a position of a user through sensors, such as image devices 470 (FIG. 4A), and/or through the I/O interface 510 or the network interface 512. The information is transferred to processor 502 via bus 508 to determine a user position. The user position is then stored in computer readable medium 504 as user position parameter 516. System 500 is configured to receive information related to VO position through sensors, such as image devices 470 (FIG. 4A), and/or through the I/O interface 510 or the network interface 512. The information is stored in computer readable medium 504 as VO position parameter 518. System 500 is configured to receive information related to VO velocity through sensors, such as image devices 470 (FIG. 4A), and/or through the I/O interface 510 or the network interface 512. The information is stored in computer readable medium 504 as VO velocity parameter 520. System 500 is configured to receive information related to articles usable or wearable by users in the images viewed by other users and ambient virtual environments through the I/O interface 510 or the network interface 512. The information is stored in computer readable medium 504 as article library parameter 522.

An aspect of this description relates to a method. The method includes receiving information related to a first user. The method further includes instructing a first display to display an image related to the first user to a second user based on the received information. The method further includes generating an image of a virtual object. The method further includes instructing a second display to display an image of the virtual object. The method further includes detecting movement of the second user. The method further includes determining a velocity of the virtual object in response to a determination that the second user contacts the virtual object based on the detected movement of the second user. The method further includes generating a moving image of the virtual object based on the determined velocity of the virtual object. The method further includes instructing the second display to display the moving image of the virtual object. In some embodiments, the method further includes determining whether the virtual object will contact the first display based on the determined velocity. In some embodiments, the method further includes instructing the first display to display the virtual object in response to a determination that the virtual object will contact the first display; and instructing the second display to cease displaying the virtual object in response to the determination that the virtual object will contact the first display. In some embodiments, instructing the second display to display the image of the virtual object includes instructing a head-mounted display (HMD). In some embodiments, instructing the first display to display the image related to the first user includes instructing a projector to display the image related to the first user on a screen. In some embodiments, the method further includes generating the image related to the first user based on the received information, wherein the received information includes information related to clothing stored in a non-transitory computer readable medium. In some embodiments, generating the image of the virtual object includes generating the image of the virtual object based on the received information. In some embodiments, the method further includes instructing the first display to cease displaying the image of the virtual object in response to instructing the second display to display the image of the virtual object. In some embodiments, determining the velocity of the virtual object includes determining that the second user contacted the virtual objet in response to a detected movement of the second user indicating that a portion of the second user overlaps with a calculated position of the virtual object. In some embodiments, the method further includes generating an image of a virtual article based on a detected position of the second user, wherein determining the velocity of the virtual object includes determining whether the virtual article contacts the virtual object.

An aspect of this description relates to a system. The system includes a non-transitory computer readable medium configured to store instructions thereon; and a processor connected to the non-transitory computer readable medium. The processor is configured to execute the instructions for receiving information related to a first user. The processor is further configured to execute the instructions for instructing a first display to display an image related to the first user to a second user based on the received information. The processor is further configured to execute the instructions for generating an image of a virtual object. The processor is further configured to execute the instructions for instructing a second display to display an image of the virtual object. The processor is further configured to execute the instructions for determining a velocity of the virtual object in response to a determination that the second user contacts the virtual object based on detected movement of the second user. The processor is further configured to execute the instructions for generating a moving image of the virtual object based on the determined velocity of the virtual object. The processor is further configured to execute the instructions for instructing the second display to display the moving image of the virtual object. In some embodiments, the system further includes a head mounted display (HMD), and the HMD is configured to function as the second display. In some embodiments, system further includes a sensor, wherein the sensor is configured to detect movement of the second user. In some embodiments, the system further includes a projector, wherein the projector is configured to function as the first display for projecting the image related to the first user on a screen. In some embodiments, the processor is further configured to transmit a notification to the second user in response to a determination that the second user is too close to the first display. In some embodiments, the processor is configured to execute the instructions for determining whether the virtual object will contact the first display based on the determined velocity. In some embodiments, the processor is configured to execute the instructions for instructing the first display to display the virtual object in response to a determination that the virtual object will contact the first display; and instructing the second display to cease displaying the virtual object in response to the determination that the virtual object will contact the first display. In some embodiments, the processor is configured to execute the instructions for generating the image of the virtual object by generating the image of the virtual object based on the received information. In some embodiments, the processor is configured to execute the instructions for instructing the first display to cease displaying the image of the virtual object in response to instructing the second display to display the image of the virtual object.

An aspect of this description relates to a system. The system includes a first sensor configured to detect movement of a first user. The system further includes a second sensor configured to detect movement of a second user. The system further includes a first display configured to display a first image related to the detected movement of the first user, wherein the first display is viewable by the second user. The system further includes a second display configured to display a second image related to the detected movement of the second user, wherein the second display is viewable by the first user. The system further includes at least one processor configured to determine movement of a virtual object based on the detected movement of the first user and the detected movement of the second user. The processor is configured to instruct the first display to display an image of the virtual object based on the determined movement of the virtual object, and instruct the second display to cease display of the image of the virtual object in response to instructing the first display to display the image of the virtual object.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving information related to a first user;
   instructing a first display to display an image related to the first user to a second user based on the received information;
   generating an image of a virtual object;
   instructing a second display to display an image of the virtual object;
   detecting movement of the second user;
   determining a velocity of the virtual object in response to a determination that the second user contacts the virtual object based on the detected movement of the second user;
   generating a moving image of the virtual object based on the determined velocity of the virtual object; and
   instructing the second display to display the moving image of the virtual object;

determining whether the virtual object will contact the first display; and instructing the second display to cease displaying the virtual object in response to the determination that the virtual object will contact the first display.

2. The method of claim 1, wherein determining whether the virtual object will contact the first display is based on the determined velocity.

3. The method of claim 1, further comprising:
instructing the first display to display the virtual object in response to a determination that the virtual object will contact the first display.

4. The method of claim 1, wherein instructing the second display to display the image of the virtual object comprises instructing a head-mounted display (HMD).

5. The method of claim 1, wherein instructing the first display to display the image related to the first user comprises instructing a projector to display the image related to the first user on a screen.

6. The method of claim 1, further comprising generating the image related to the first user based on the received information, wherein the received information includes information related to clothing stored in a non-transitory computer readable medium.

7. The method of claim 1, wherein generating the image of the virtual object comprises generating the image of the virtual object based on the received information.

8. The method of claim 7, further comprising instructing the first display to cease displaying the image of the virtual object in response to instructing the second display to display the image of the virtual object.

9. The method of claim 1, wherein determining the velocity of the virtual object comprises determining that the second user contacted the virtual object in response to a detected movement of the second user indicating that a portion of the second user overlaps with a calculated position of the virtual object.

10. The method of claim 1, further comprising generating an image of a virtual article based on a detected position of the second user, wherein determining the velocity of the virtual object comprises determining whether the virtual article contacts the virtual object.

11. A system comprising:
a non-transitory computer readable medium configured to store instructions thereon; and
a processor connected to the non-transitory computer readable medium, wherein the processor is configured to execute the instructions for:
receiving information related to a first user;
instructing a first display to display an image related to the first user to a second user based on the received information;
generating an image of a virtual object;
instructing a second display to display an image of the virtual object;
determining a velocity of the virtual object in response to a determination that the second user contacts the virtual object based on detected movement of the second user;
generating a moving image of the virtual object based on the determined velocity of the virtual object; and
instructing the second display to display the moving image of the virtual object; and
a first projector, wherein the projector is configured to function as the first display for projecting the image related to the first user on a screen.

12. The system of claim 11, further comprising a head mounted display (HMD), and the HMD is configured to function as the second display.

13. The system of claim 11, further comprising a sensor, wherein the sensor is configured to detect movement of the second user.

14. The system of claim 11, wherein the processor is further configured to execute the instructions for instructing the second display a proximity line or a separation line.

15. The system of claim 11, wherein the processor is further configured to transmit a notification to the second user in response to a determination that the second user is too close to the first display.

16. The system of claim 11, wherein the processor is configured to execute the instructions for determining whether the virtual object will contact the first display based on the determined velocity.

17. The system of claim 16, wherein the processor is configured to execute the instructions for:
instructing the first display to display the virtual object in response to a determination that the virtual object will contact the first display; and
instructing the second display to cease displaying the virtual object in response to the determination that the virtual object will contact the first display.

18. The system of claim 11, wherein the processor is configured to execute the instructions for generating the image of the virtual object by generating the image of the virtual object based on the received information.

19. The system of claim 18, wherein the processor is configured to execute the instructions for instructing the first display to cease displaying the image of the virtual object in response to instructing the second display to display the image of the virtual object.

20. A system comprising:
a first sensor configured to detect movement of a first user;
a second sensor configured to detect movement of a second user;
a first display configured to display a first image related to the detected movement of the first user, wherein the first display is viewable by the second user;
a second display configured to display a second image related to the detected movement of the second user, wherein the second display is viewable by the first user; and
at least one processor configured to determine movement of a virtual object based on the detected movement of the first user and the detected movement of the second user, wherein the processor is configured to:
instruct the first display to display an image of the virtual object based on the determined movement of the virtual object, and
instruct the second display to cease display of the image of the virtual object in response to instructing the first display to display the image of the virtual object.

\* \* \* \* \*